(12) United States Patent
Ning et al.

(10) Patent No.: US 8,297,919 B2
(45) Date of Patent: Oct. 30, 2012

(54) TURBINE AIRFOIL CLOCKING

(75) Inventors: Wei Ning, Greenville, SC (US); Michael E. Friedman, Simpsonville, SC (US); John F. Ryman, Greer, SC (US)

(73) Assignee: General Electric Company, Schenectady, NY (US)

( * ) Notice: Subject to any disclaimer, the term of this patent is extended or adjusted under 35 U.S.C. 154(b) by 1006 days.

(21) Appl. No.: 12/262,333

(22) Filed: Oct. 31, 2008

(65) Prior Publication Data

US 2010/0111684 A1  May 6, 2010

(51) Int. Cl.
*F01D 1/00* (2006.01)
*F01D 9/04* (2006.01)
(52) U.S. Cl. ..................... 415/193; 415/209.1
(58) Field of Classification Search ............... 415/1, 193, 415/209.1
See application file for complete search history.

(56) References Cited

U.S. PATENT DOCUMENTS 5,486,091 A * 1/1996 Sharma .................. 415/194

* cited by examiner

*Primary Examiner* — David S Blum
(74) *Attorney, Agent, or Firm* — Mark E. Henderson; Ernest G. Cusick; Frank A. Landgraff

(57) ABSTRACT

An assembly of airfoils in a turbine engine, the assembly comprising: at least three successive axially stacked rows of airfoils in one of a compressor and a turbine: a first airfoil row, a second airfoil row, and a third airfoil row; wherein the first airfoil row and the third airfoil row each comprise one of a row of rotor blades and a row of stator blades, and the second airfoil row comprises the other; and wherein at least a majority of the mid-channel points of the airfoils in the third airfoil row are positioned circumferentially within +/−25% pitch of the third airfoil row with respect to the location at which a wake flow during a selected operating condition from the first airfoil row is determined to enter the third airfoil row.

17 Claims, 5 Drawing Sheets

TURBINE AIRFOIL CLOCKING

BACKGROUND OF THE INVENTION

This present application relates to turbine engines. More specifically, but not by way of limitation, the present application relates to the positioning of airfoils in one row with respect to airfoils in neighboring or nearby rows such that certain operational benefits are achieved.

A gas turbine engine typically includes a compressor, a combustor, and a turbine. The compressor and turbine generally include rows of airfoils or blades that are axially stacked in stages. Each stage generally includes a row of circumferentially spaced stator blades, which are fixed, and a set of circumferentially spaced rotor blades, that rotate about a central axis or shaft. Generally, in operation, the rotor blades in the compressor rotor rotate about the shaft to compress a flow of air. The supply of compressed air is used in the combustor to combust a supply of fuel. The resulting flow of hot gases from the combustion is expanded through the turbine, which causes the turbine rotor blades to rotate about the shaft. In this manner, the energy contained in the fuel is converted into the mechanical energy of the rotating blades, which may be used to rotate the rotor blades of the compressor and the coils of a generator to generate electricity. During operation, because of the extreme temperatures, the velocity of the working fluid, and the rotational velocity of the rotor blades, the stator blades and the rotor blades, through both the compressor and the turbine, are highly stressed parts.

Often, in both the compressor and the turbine sections of the turbine engine, rows of stator or rotor blades of nearby or neighboring stages are configured with substantially the same number of circumferentially spaced blades. In an effort to improve the aero-efficiency of turbine engines, efforts have been made to index or "clock" the relative circumferential positions of the blades in one row to the circumferential position of the blades in nearby or neighboring rows. However, while only minimally or negligibly improving engine aero-efficiency, it has been discovered that such conventional clocking methods generally function to increase the mechanical stresses acting on airfoils during operation. Of course, increased operational stresses can cause blade failures, which may result in extensive damage to the gas turbine engine. At the very least, increased operational stresses shorten the part life of the airfoils, which increases to the cost of operating the engine.

The ever-increasing demand for energy makes the objective of engineering more efficient turbine engines an ongoing and significant one. However, many of the ways in which turbine engines are made more efficient place additional stress on the airfoils of the compressor and turbine sections of the engine. That is, turbine efficiency generally may be increased through several means, including greater size, firing temperatures, and/or rotational velocities, all of which place greater strain on the airfoils during operation. As a result, new methods and systems that reduce the stresses on turbine airfoils are needed. A new method or system for clocking turbine airfoils that reduces the operational stresses acting on airfoils would be an important step toward engineering more efficient turbine engines.

BRIEF DESCRIPTION OF THE INVENTION

The present application thus describes the following. In a turbine engine that includes at least three successive axially stacked rows of airfoils in one of a compressor and a turbine: a first airfoil row, a second airfoil row, and a third airfoil row; wherein the first airfoil row and the third airfoil row both comprise one of a row of rotor blades and a row of stator blades, and the second airfoil row comprises the other; the method of establishing the circumferential position of the airfoils of the third airfoil row with respect to the circumferential position blades of the first row of blades, comprising: selecting an operating condition; determining at the operating condition the path of the wake flow from the trailing edge of the airfoils in the first airfoil row; determining at the operating condition the path of the wake flow as the wake flow passes through the second airfoil row; determining at the operating condition the path of the wake flow from the second airfoil row to the location where the wake flow enters the third airfoil row; and locating at least a majority of the mid-channel points of the airfoils in the third airfoil row within +/−25% pitch of the third airfoil row with respect to the location at which the wake flow is determined to enter the third airfoil row.

In a turbine engine that includes as least five successive axially stacked rows of airfoils in one of a compressor and a turbine: a first airfoil row, a second airfoil row, a third airfoil row, a fourth airfoil row, and a fifth airfoil row; wherein the first airfoil row, the third airfoil row, and the fifth airfoil row each comprise one of a row of rotor blades and a row of stator blades, and the second airfoil row and the fourth airfoil row comprises the other; the method of establishing the circumferential position of the airfoils of the first airfoil row, the airfoils of the third airfoil row and the airfoils of the fifth airfoil row with respect each other, comprising: selecting an operating condition; determining at the operating condition the path of the wake flow from the trailing edge of the airfoils in the first airfoil row; determining at the operating condition the path of the wake flow as the wake flow enters and passes through the second airfoil row; determining at the operating condition the path of the wake flow from the second airfoil row to the location where the wake flow enters the third airfoil row; determining at the operating condition the path of the wake flow from the trailing edge of the airfoils in the third airfoil row; determining at the operating condition the path of the wake flow as the wake flow enters and passes through the fourth airfoil row; determining at the operating condition the path of the wake flow from the fourth airfoil row to the location where the wake flow enters the fifth airfoil row; locating at least a majority of the mid-channel points of the airfoils in the third airfoil row within +/−25% pitch of the third airfoil row with respect to the location at which the wake flow is determined to enter the third airfoil row; and locating at least a majority of the mid-channel points of the airfoils in the fifth airfoil row within +/−25% pitch of the fifth airfoil row with respect to the location at which the wake flow is determined to enter the fifth airfoil row.

An assembly of airfoils in a turbine engine, the assembly comprising: at least three successive axially stacked rows of airfoils in one of a compressor and a turbine: a first airfoil row, a second airfoil row, and a third airfoil row; wherein the first airfoil row and the third airfoil row each comprise one of a row of rotor blades and a row of stator blades, and the second airfoil row comprises the other; and wherein at least a majority of the mid-channel points of the airfoils in the third airfoil row are positioned circumferentially within +/−25% pitch of the third airfoil row with respect to the location at which a wake flow during a selected operating condition from the first airfoil row is determined to enter the third airfoil row.

An assembly of airfoils in a turbine engine, the assembly comprising: at least five successive axially stacked rows of airfoils in one of a compressor and a turbine: a first airfoil row, a second airfoil row, a third airfoil row, a fourth airfoil row, and a fifth airfoil row; wherein: the first airfoil row, the third airfoil row, and the fifth airfoil row each comprise one of a row of rotor blades and a row of stator blades, and the second airfoil row and the fourth airfoil row each comprise the other; at least a majority of the mid-channel points of the airfoils in the third airfoil row are positioned circumferentially within 25% pitch of the third airfoil row with respect to the location at which a wake flow during a selected operating condition from the first airfoil row is determined to enter the third airfoil row; and at least a majority of the mid-channel points of the airfoils in the fifth airfoil row are positioned circumferentially within 25% pitch of the fifth airfoil row with respect to the location at which a wake flow during the selected operating condition from the third airfoil row is determined to enter the fifth airfoil row.

These and other features of the present application will become apparent upon review of the following detailed description of the preferred embodiments when taken in conjunction with the drawings and the appended claims.

BRIEF DESCRIPTION OF THE DRAWINGS

These and other objects and advantages of this invention will be more completely understood and appreciated by careful study of the following more detailed description of exemplary embodiments of the invention taken in conjunction with the accompanying drawings, in which.

DETAILED DESCRIPTION OF THE INVENTION

Figure 1:
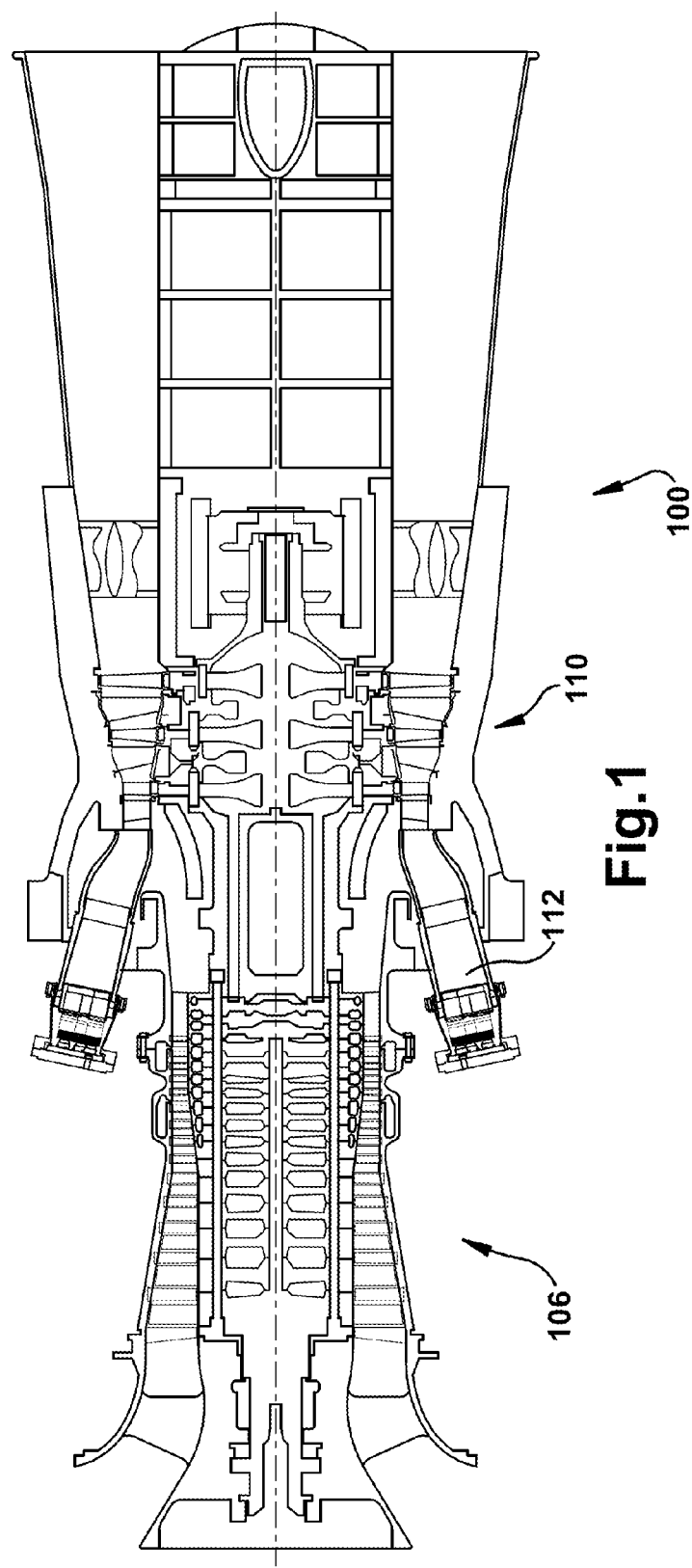
FIG. 1 is a schematic representation of an exemplary turbine engine in which embodiments of the present application may be used.

Referring now to the figures, FIG. 1 illustrates a schematic representation of a gas turbine engine 100. In general, gas turbine engines operate by extracting energy from a pressurized flow of hot gas that is produced by the combustion of a fuel in a stream of compressed air. As illustrated in FIG. 1, gas turbine engine 100 may be configured with an axial compressor 106 that is mechanically coupled by a common shaft or rotor to a downstream turbine section or turbine 110, and a combustor 112 positioned between the compressor 106 and the turbine 110. Note that the following invention may be used in all types of turbine engines, including gas turbine engines, steam turbine engines, aircraft engines, and others. Hereinafter, the invention will be described in relation to a gas turbine engine. This description is exemplary only and not intended to be limiting in any way.

Figure 2:
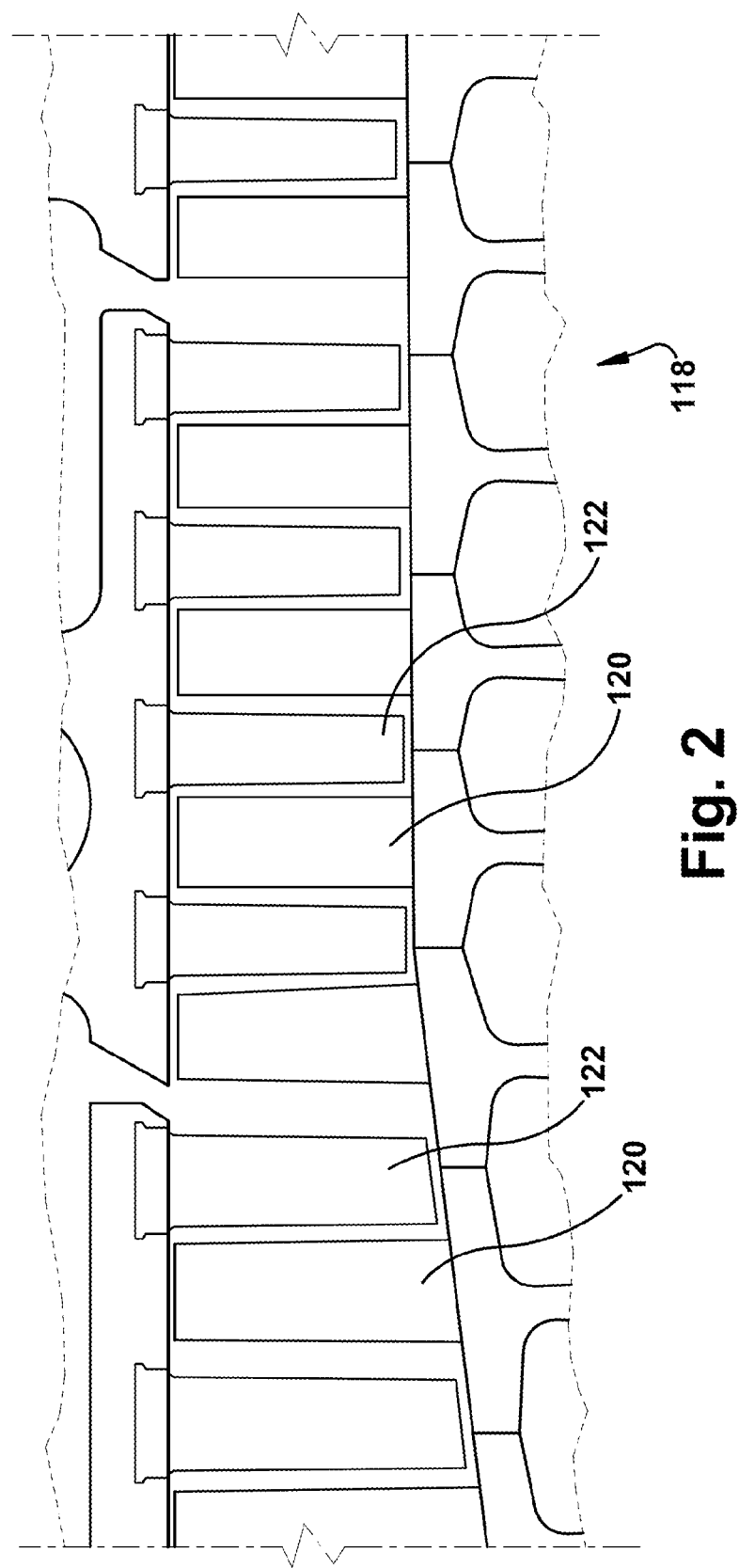
FIG. 2 is a sectional view of a compressor in a gas turbine engine in which embodiments of the present application may be used.

FIG. 2 illustrates a view of an exemplary multi-staged axial compressor 118 that may be used in gas turbine engine. As shown, the compressor 118 may include a plurality of stages. Each stage may include a row of compressor rotor blades 120 followed by a row of compressor stator blades 122. Thus, a first stage may include a row of compressor rotor blades 120, which rotate about a central shaft, followed by a row of compressor stator blades 122, which remain stationary during operation. The compressor stator blades 122 generally are circumferentially spaced one from the other and fixed about the axis of rotation. The compressor rotor blades 120 are circumferentially spaced about the axis of the rotor and rotate about the shaft during operation. As one of ordinary skill in the art will appreciate, the compressor rotor blades 120 are configured such that, when spun about the shaft, they impart kinetic energy to the air or working fluid flowing through the compressor 118. As one of ordinary skill in the art will appreciate, the compressor 118 may have many other stages beyond the stages that are illustrated in FIG. 2. Each additional stage may include a plurality of circumferential spaced compressor rotor blades 120 followed by a plurality of circumferentially spaced compressor stator blades 122.

Figure 3:
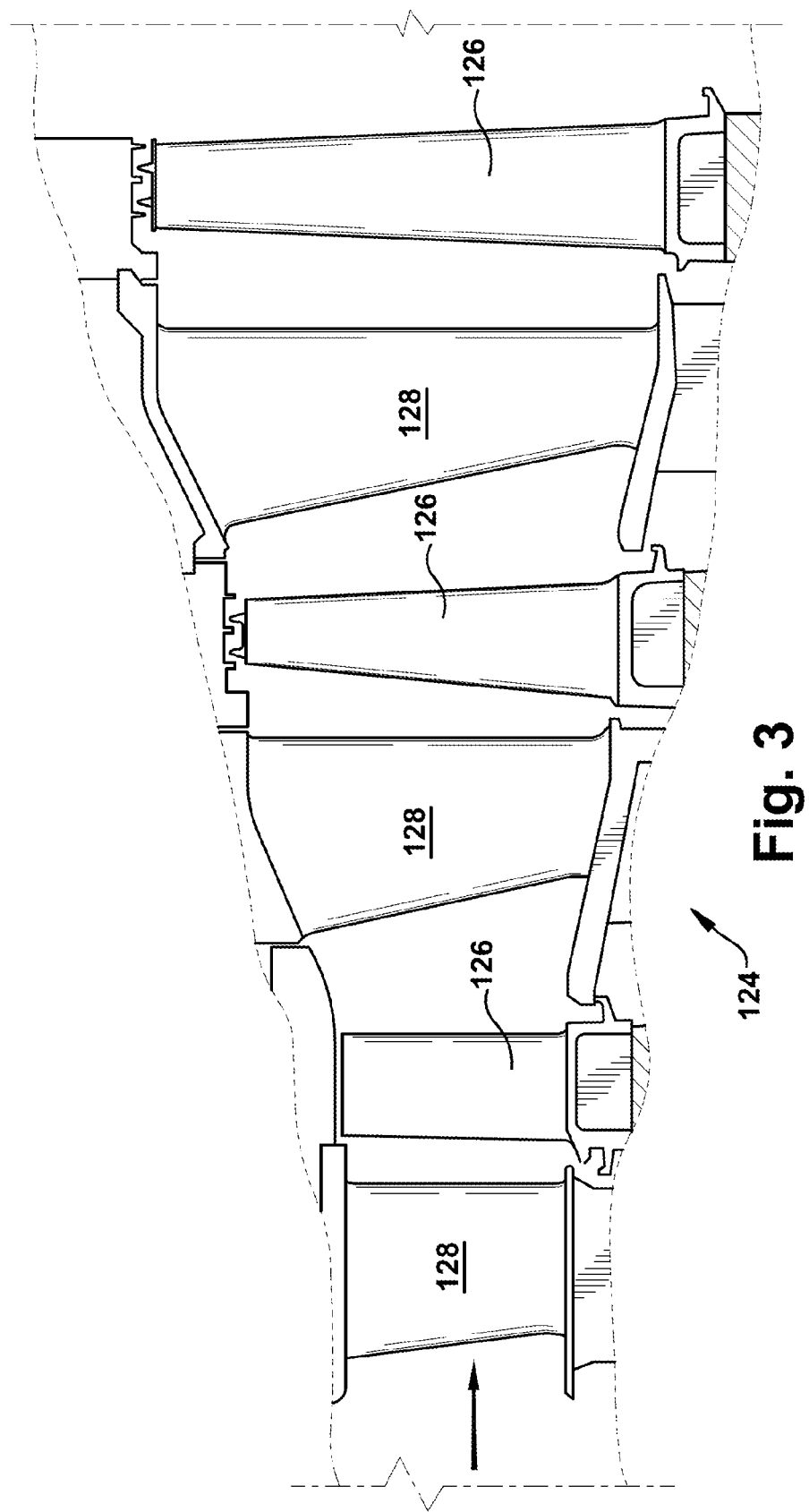
FIG. 3 is a sectional view of a turbine in a gas turbine engine in which embodiments of the present application may be used.

FIG. 3 illustrates a partial view of an exemplary turbine section or turbine 124 that may be used in the gas turbine engine. The turbine 124 may include a plurality of stages. Three exemplary stages are illustrated, but more or less stages may present in the turbine 124. A first stage includes a plurality of turbine buckets or turbine rotor blades 126, which rotate about the shaft during operation, and a plurality of nozzles or turbine stator blades 128, which remain stationary during operation. The turbine stator blades 128 generally are circumferentially spaced one from the other and fixed about the axis of rotation. The turbine rotor blades 126 may be mounted on a turbine wheel (not shown) for rotation about the shaft (not shown). A second stage of the turbine 124 is also illustrated. The second stage similarly includes a plurality of circumferentially spaced turbine stator blades 128 followed by a plurality of circumferentially spaced turbine rotor blades 126, which are also mounted on a turbine wheel for rotation. A third stage also is illustrated, and similarly includes a plurality of circumferentially spaced turbine stator blades 128 and turbine rotor blades 126. It will be appreciated that the turbine stator blades 128 and turbine rotor blades 126 lie in the hot gas path of the turbine 124. The direction of flow of the hot gases through the hot gas path is indicated by the arrow. As one of ordinary skill in the art will appreciate, the turbine 124 may have many other stages beyond the stages that are illustrated in FIG. 3. Each additional stage may include a plurality of circumferential spaced turbine stator blades 128 followed by a plurality of circumferentially spaced turbine rotor blades 126.

Note that as used herein, reference, without further specificity, to "rotor blades" is a reference to the rotating blades of either the compressor 118 or the turbine 124, which include both compressor rotor blades 120 and turbine rotor blades 126. Reference, without further specificity, to "stator blades" is a reference to the stationary blades of either the compressor 118 or the turbine 124, which include both compressor stator blades 122 and turbine stator blades 128. The term "airfoil" will be used herein to refer to either type of blade. Thus, without further specificity, the term "airfoil" is inclusive to all type of turbine engine blades, including compressor rotor blades 120, compressor stator blades 122, turbine rotor blades 126, and turbine stator blades 128.

In use, the rotation of compressor rotor blades 120 within the axial compressor 118 may compress a flow of air. In the combustor 112, energy may be released when the compressed air is mixed with a fuel and ignited. The resulting flow of hot gases from the combustor 112 then may be directed over the turbine rotor blades 126, which may induce the rotation of the turbine rotor blades 126 about the shaf, thus transforming the energy of the hot flow of gases into the mechanical energy of the rotating shaft. The mechanical energy of the shaft may then be used to drive the rotation of the compressor rotor blades 120, such that the necessary supply of compressed air is produced, and also, for example, a generator to produce electricity.

Often, in both gas turbine compressors 106 and turbines 110, nearby or neighboring rows of airfoils 130 have substantially the same configuration, i.e., have substantially the same number of similarly sized airfoils that are spaced similarly around the circumference of the row. When this is the case and, in addition, when two or more rows operate such that there is no relative motion between each (as would be the case, for example, between two or more rows of rotor blades or two or more rows of stator blades), the airfoils in these rows may be "clocked." As used herein, the term "clocked" or "clocking" refers to the fixed circumferential positioning of airfoils in one row in relation to the circumferential positioning of corresponding airfoils in nearby rows.

Figure 4:
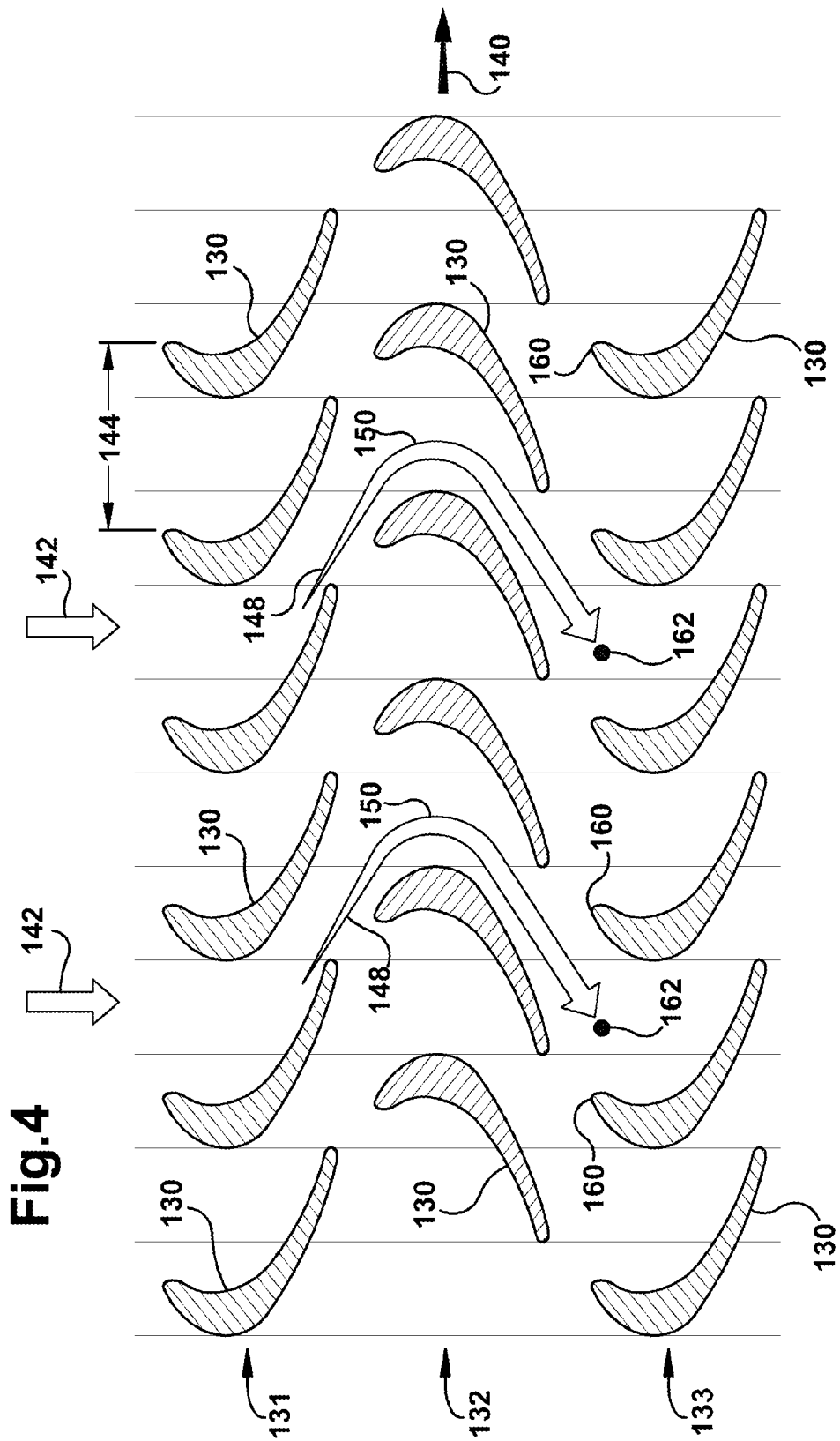
FIG. 4 is a schematic representation of neighboring rows of airfoils illustrating a flow pattern through an exemplary clocking relationship according to an exemplary embodiment of the present invention.

FIG. 4 is a schematic representation of neighboring rows of airfoils illustrating a flow pattern through an exemplary airfoil clocking relationship. FIG. 4 includes four rows of airfoils 130 shown side-by-side: a first airfoil row 131, a second airfoil row 132, and a third airfoil row 133. As one of ordinary skill in the art will readily appreciated, the first airfoil row 131 and the third airfoil row 133 may each represent a row of rotor blades and the second airfoil row 132 may represent a row of stator blades, or, the first airfoil row 131 and the third airfoil row 133 may each represent a row of stator blades and the second airfoil row 132 may represent a row of rotor blades. Further, as one of ordinary skill in the art will appreciate, the first airfoil row 131 and the third airfoil row 133, whether they are stator blades or rotor blades, have substantially no relative motion between them (i.e., both remain stationary or both rotate at the same velocity during operation). Whereas, both the first airfoil row 131 and the third airfoil row 133 have substantially the same relative motion during operation in relationship to the second airfoil row 132 (i.e., either both the first airfoil row 131 and the third airfoil row 133 rotate while the second airfoil row 132 remains stationary, or both the first airfoil row 131 and the third airfoil row 133 remain stationary while the second airfoil row 132 rotates). Further, as already described, for clocking to be most effective between the rows, each of the clocked rows must be configured similarly. As such, airfoil rows one 131 and three 133 can be assumed to have substantially the same number of airfoils, and the airfoils on the rows can be assumed to be substantially the same size and have substantially the same spacing around the circumference of each row.

The relative motion of the second airfoil row 132 is indicated by arrow 140. The flow direction, which may represent the direction of flow through either the compressor 118 or the turbine 124, whatever the case may be, is indicated by arrows 142. Note that the exemplary airfoil rows used in FIGS. 4 and 5 have been described with the terms "first," "second," and "third". This description is applicable only to the relative positioning of the illustrated rows in regard to the other rows in the figure, and is not indicative of overall positioning with respect to other rows of airfoils that may be in the turbine engine. For example, other rows of airfoils may be positioned upstream of "first airfoil row 131" (i.e., the first airfoil row 131 is not necessarily the first row of airfoils in the compressor or the turbine section of the turbine engine).

The "pitch" of a row of airfoils is used herein to refer to the measurement of the repeating pattern around the circumference of a particular row. Thus, the pitch may be described as the circumferential distance between, for example, the leading edge of an airfoil in a particular row and the leading edge of either of the neighboring airfoils in the same row. The pitch also, for example, may describe the circumferential distance between the trailing edge of an airfoil in a particular row and the trailing edge of either of the neighboring airfoils in the same row. It will be appreciated that in order for clocking to be more effective, the two rows that are clocked generally will have a pitch measurement that is substantially the same. The first airfoil row 131 and the third airfoil row 133, as illustrated, have substantially the same pitch, which has been indicated in the first airfoil row 131 on FIG. 4 as distance 144.

As one of ordinary skill in the art will appreciate, at the trailing edges 146 of the airfoils 130 in the first airfoil row 131, during operation, there is formed a wake 148. The "wake," as used herein, is an area of turbulent flow that is directed downstream from the trailing edge of an airfoil. Knowing the velocity and angle of this wake 148, the continuation of which is shown as wake flow 150, the location of the entrance to the second row of airfoils 132 can be calculated. The "wake flow," as used herein, is the area of turbulent flow that continues downstream from the wake. As stated, the relative motion of the second row of airfoils 132 is shown by arrow 140.

As one of ordinary skill in the art will appreciate, known calculation of the flow triangle establishes the wake flow 150 through the airfoils of the second airfoil row 132, leading to the direction and velocity of the wake flow 150 leaving the airfoils. As such, knowing the distance between the airfoils in the second airfoil row 132 and the airfoils in the third airfoil row 133, an entry point into the third airfoil row 133 may be calculated. As stated, prior art clocking methods teach that, in order to optimize aero-efficiency, the airfoils of the first airfoil row 131 and the third airfoil row 133 should be clocked such that the wake enters the third airfoil row 133 at or near the leading edges 160 of the airfoils of the third airfoil row 133.

It has been discovered, however, that any improvements in aero-efficiency is accompanied by significant increases to the operational or mechanical stresses that act on the airfoils of the several rows during operation and, particularly, given this example, increasing the stresses felt by the second airfoil row 132. In fact, by intentionally clocking the airfoils of the third airfoil row 133 such that the each wake enters the row away from each of the leading edges 140 of the airfoils, operational stresses felt by the airfoils and, particularly, those airfoils in the second airfoil row 132, may be reduced. In order to optimize this reduction in operational stresses to the airfoils, the airfoils of the first airfoil row 131 and the third airfoil row 133 should be clocked such that the wake enters the third airfoil row 133 at a point approximately half-way between the leading edge points 160 of two neighboring airfoils (which hereinafter will be referred to as the "mid-channel point 162"). In addition, experimental data teaches that the precision of this location is not overly critical for appreciable benefits to be realized, and that locations within plus or minus 25% pitch, and particularly 15% pitch, of the optimum location yield significant benefits also.

As one of ordinary skill in the art will appreciate, three dimensional unsteady flow calculations can be performed to establish the wake 148 leaving the airfoils of the first airfoil row 131 and the wake flow 150 through the airfoils of the second airfoil row 132. At this point, the wake flow 150 redirects through the second airfoil row 132, and its resulting circumferential position entering the third airfoil row 133 can be numerically determined. One method of doing this, for example, is a time marching finite volume Euler solver using Ni's scheme. This approach is described in the following references:

1. Ni, R. H. and Bogoian, J. C., "Prediction of 3D Multistage Turbine Flow Field Using a Multiple-Grid Euler Solver", AIAA paper 89-0203.

2. Ni, R. H., Sharma, O. P., Takahashi, R., and Bogoian, J. C., "3D Unsteady Flow Simulation Through a Turbine Stage", paper presented in the 1989 Australian Aeronautical Conference—Research and Technology—The Next Decade, Melbourne, Australia, 1989.

3. Takahashi, R., and Ni, R. H., "Unsteady Euler Analysis of the Redistribution of an Inlet Temperature Distortion in a Turbine", AIAA paper 90-2262, 1990.

4. Ni, R. H., "A Multiple-Grid Scheme for Solving the Euler Equations", AIAA paper 81-1025, 1981, and AIAA Journal Vol. 20, No. 11, 1982.

As one of ordinary skill in the art will appreciate, for this calculation, the wake 148 exiting the first airfoil row 132 can be created by applying a calibrated surface shear model to the momentum equation as the source term. The wake flow 150 can then be allowed to pass inviscidly through the second airfoil row 132 so that it's trajectory can be seen with entropy contours. The wake flow 150 is chopped by the relative motion of the second airfoil row 132 into discrete pulses that exit the passage at fixed circumferential locations relative to the second airfoil row 132. When this wake flow 150 is time averaged, these pulses appear as a continuous stream into the third airfoil row 133. It is these time average wake flows 150 entering the third airfoil row 133 that may be used to establish the clocking of the third airfoil row 133 (i.e., the circumferential positioning) with respect to the first airfoil row 131.

As described, the optimized reduction in operational or mechanical stresses acting on the several rows of airfoils, and particularly the airfoils of the second airfoil row 132, occurs when the wake flow 150 resulting from the wake 148 of the first airfoil row 131 is calculated to enter the third airfoil row 133 at the mid-channel point 162. Conversely, the greatest increase in mechanical operating stresses to the several rows of airfoils, and particularly the second airfoil row 132, occurs when the wake flow 150 resulting from the wake 148 of the first airfoil row 131 strikes the leading edges 160 of the airfoils in the third airfoil row 133.

Figure 5:
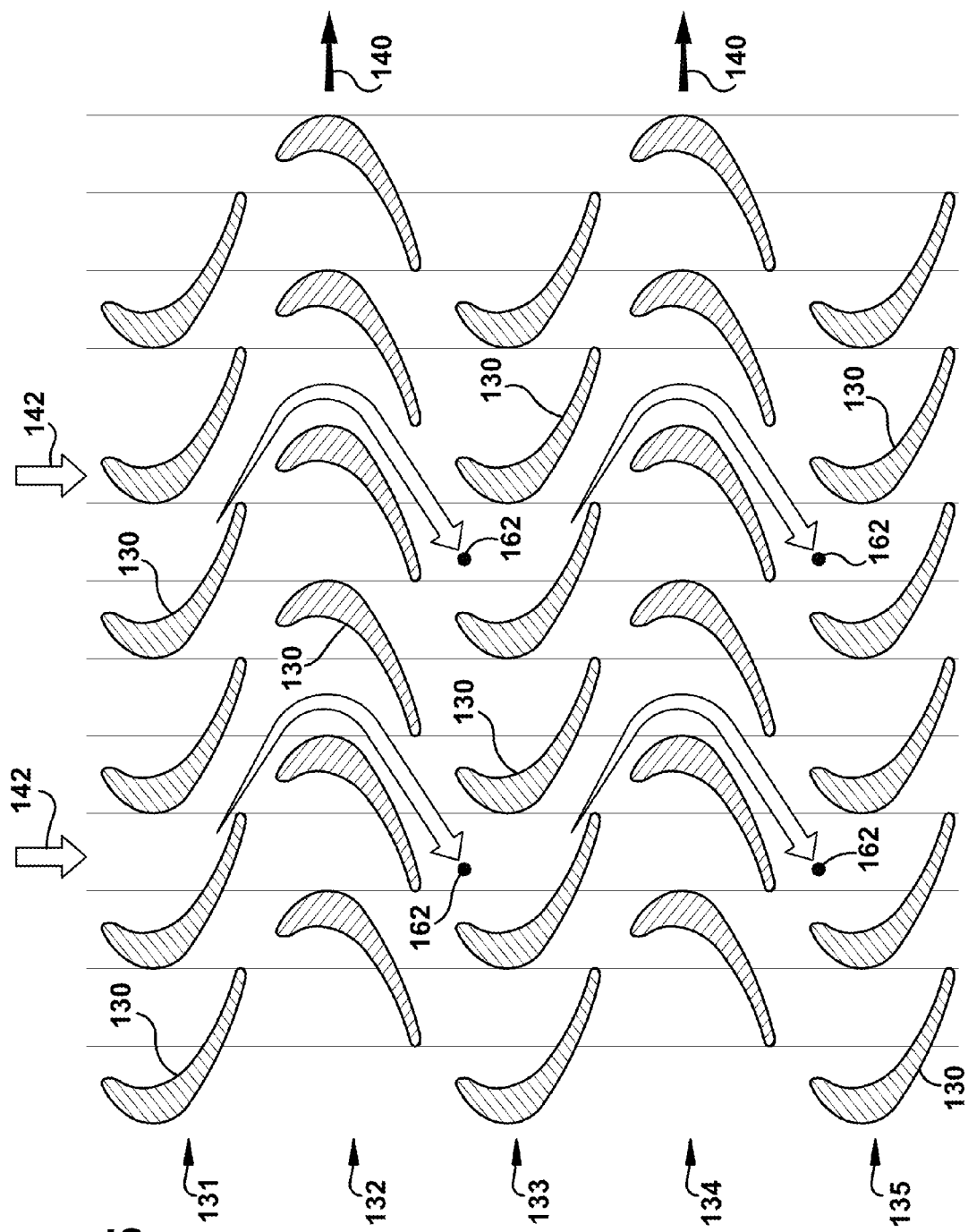
FIG. 5 is a schematic representation of neighboring rows of airfoils illustrating a flow pattern through another exemplary clocking relationship according to an alternative embodiment of the present invention.

FIG. 5 includes additional row of airfoils: a fourth airfoil row 134 and a fifth airfoil row 135. In the same manner as that described above for the second airfoil row 132, the operational stresses on the fourth airfoil row 134 may be reduced by clocking the fifth airfoil row 135 in relation to the wake 148 and resulting wake flow 150 from the third airfoil row 133 such that the wake flow 150 enters the fifth airfoil row 135 at approximately the mid-channel point 162. In some embodiments, where two airfoil rows are clocked to the advantage of an airfoil row between them, the middle airfoil row may be a row of stator blades and the two clocked airfoil rows may be rows of rotor blades. In other embodiments, the middle airfoil row may be a row of rotor blades and the two clocked airfoil rows may be rows of stator blades. The airfoil rows may be compressor airfoil rows or turbine airfoil rows.

Additionally, it has been discovered that the operational stresses acting on a particular row of airfoils may be further reduced by clocking more than just the two neighboring airfoil rows, i.e., the airfoils directly to each side. For example, in the manner described above in relation to FIG. 4, the first airfoil row 131, the third airfoil row 133, and the fifth airfoil row 135 may be clocked in relation to each other such that the row situated in the relative position of the fourth airfoil row 134 may experience, in some embodiments, a more significant reduction in the mechanical stresses of operation. As such, the third airfoil row 133 may be clocked in relation to the wake 148 and resulting wake flow 150 from the first airfoil row 131 such that the wake flow 150 enters the third airfoil row 133 at approximately the mid-channel point 162, and, the fifth airfoil row 135 may be clocked in relation to the wake 148 and resulting wake flow 150 from the third airfoil row 133 such that the wake flow 150 enters the fifth airfoil row 135 at approximately the mid-channel point 162. As before, experimental data teaches that the precision of this location is not critical and that locations within plus or minus 25% pitch, and particularly 15% pitch, of this optimum location for each of the rows yield significant benefits.

In some embodiments, where three airfoil rows are clocked in the manner described above, the first airfoil row 131, the third airfoil row 133, and the fifth airfoil row 155 may be rows of rotor blades and the second airfoil row 132 and the fourth airfoil row 134 may be rows of stator blades. In other embodiments, the first airfoil row 131, the third airfoil row 133, and the fifth airfoil row 135 may be rows of stator blades and the second airfoil row 132 and the fourth airfoil row 134 may be a row of rotor blades. In either case, the airfoil rows may be located in the compressor or the turbine of a turbine engine. As a further advantage, the operational stresses acting on the rows of airfoils that are clocked in relation to each other, which, might include, for example, the first airfoil row 131 and the third airfoil row 133, or might include the first airfoil row 131, the third airfoil row 133, and the fifth airfoil row 135, also may be reduced.

Additionally, in some embodiments, where three airfoil rows are clocked, such as the first airfoil row 131, the third airfoil row 133, and the fifth airfoil row 135, the first airfoil row 131 may be a row of compressor rotor blades, the second airfoil row 132 may be a row of compressor stator blades, the third airfoil row 133 may be a row of compressor rotor blades, the fourth airfoil row 134 may be a row of compressor stator blades, and the fifth airfoil row 135 may be a row of compressor rotor blades. More specifically, in another exemplary embodiment of the present application, the first airfoil row 131 may be the row of compressor rotor blades in the fourteenth stage of the compressor, the second airfoil row 132 may be the row of compressor stator blades in the fourteenth stage of the compressor, the third airfoil row 133 may be the row of compressor rotor blades in the fifteenth stage of the compressor, the fourth airfoil row 134 may be the row of compressor stator blades in the fifteenth stage of the compressor, and the fifth airfoil row 135 may be the row of compressor rotor blades in the sixteenth stage of the compressor.

In some cases of this exemplary embodiment, the fourteenth stage, the fifteenth stage, and the sixteenth stage may be the fourteenth, fifteenth, and sixteenth stages of a F-Class Compressor of a 7F or 9F Gas Turbine Engine manufactured by The General Electric Company of Schenectady, N.Y. Additionally, in this example and in some embodiments, the compressor may have 17 total stages of airfoils, each stage having a single row of rotor blades followed by a single row of stator blades. The row of rotor blades in the fourteenth stage may have a total of 64 rotor blades, the row of rotor blades in the fifteenth stage may have a total of 64 rotor blades, and the row of rotor blades in the sixteenth stage may have a total of 64 rotor blades. Finally, in some embodiments, the row of stator blades in the fourteenth stage may have a total of 132 stator blades, the row of stator blades in the fifteenth stage may have a total of 130 stator blades, and the row of stator blades in the sixteenth stage may have a total of 132 stator blades. It has been found through experimental data and analytical modeling that clocking relationships, as those described and claimed herein, function well with the compressor configurations described above in this paragraph.

As one of ordinary skill in the relevant art will appreciate, turbine engines generally operate at several different load levels or operating conditions depending on certain criteria. In analyzing the path of the wake flow and where it intersects or enters a downstream airfoil row, generally, in some embodiments, a determination of the path for one set of operating conditions may be different than that for another set of operating conditions. Thus, different sets of operating conditions might require different clocking relationships between the first and third airfoil rows (and, in some embodiments, the fifth airfoil row). As such, where the circumferential positioning of airfoils is fixed or time consuming to achieve, a desired operating condition might be selected and the airfoils rows clocked according to it. The chosen operating condition often may be a longest term operating condition so that the benefits are more significant.

From the above description of preferred embodiments of the invention, those skilled in the art will perceive improvements, changes and modifications. Such improvements, changes and modifications within the skill of the art are intended to be covered by the appended claims. Further, it should be apparent that the foregoing relates only to the described embodiments of the present application and that numerous changes and modifications may be made herein without departing from the spirit and scope of the application as defined by the following claims and the equivalents thereof.

We claim:

1. In a turbine engine that includes at least three successive axially stacked rows of airfoils in one of a compressor and a turbine: a first airfoil row, a second airfoil row, and a third airfoil row; wherein the first airfoil row and the third airfoil row both comprise one of a row of rotor blades and a row of stator blades, and the second airfoil row comprises the other; the method of establishing the circumferential position of the airfoils of the third airfoil row with respect to the circumferential position blades of the first row of blades, comprising:
    selecting an operating condition;
    determining at the operating condition the path of the wake flow from the trailing edge of the airfoils in the first airfoil row;
    determining at the operating condition the path of the wake flow as the wake flow passes through the second airfoil row;
    determining at the operating condition the path of the wake flow from the second airfoil row to the location where the wake flow enters the third airfoil row; and
    locating at least a majority of the mid-channel points of the airfoils in the third airfoil row within +/−25% pitch of the third airfoil row with respect to the location at which the wake flow is determined to enter the third airfoil row;
    wherein:
    the first airfoil row comprises a row of rotor blades in a fourteenth stage of the compressor;
    the second airfoil row comprises a row of stator blades in the fourteenth stage of the compressor;
    the third airfoil row comprises a row of rotor blades in a fifteenth stage of the compressor;
    the row of rotor blades in the fourteenth stage comprises 64 rotor blades, and the row of rotor blades in the fifteenth stage comprises 64 rotor blades; and
    the row of stator blades in the fourteenth stage comprises 132 stator blades.

2. The method according to claim 1, wherein substantially all of the mid-channel points of the airfoils in the third airfoil row are located within +/−25% pitch of the third airfoil row with respect to the location at which the wake flow is determined to enter the third airfoil row.

3. The method according to claim 1, wherein:
    the turbine engine is configured such that there is substantially no relative motion between the first airfoil row and the third airfoil row during operation;
    the turbine engine is configured such that the first airfoil row and the third airfoil row have substantially the same relative motion in relation to the second airfoil row during operation; and
    the turbine engine is configured such that the first airfoil row and the third airfoil row have substantially the same number of airfoils.

4. The method according to claim 1, wherein the pitch comprises the circumferential distance between a point on an airfoil in an airfoil row and the same point on either of the neighboring airfoils in the same row.

5. The method according to claim 1, wherein at least a majority of the mid-channel points of the airfoils in the third airfoil row are located within +/−24.5% pitch of the third airfoil row with respect to the location at which the wake flow is determined to enter the third airfoil row.

6. The method according to claim 1, wherein at least a majority of the mid-channel points of the airfoils in the third airfoil row are located within +/−15% pitch of the third airfoil row with respect to the location at which the wake flow is determined to enter the third airfoil row.

7. The method according to claim 1, wherein at least a majority of the mid-channel points of the airfoils in the third airfoil row are located within +/−5% pitch of the third airfoil row with respect to the location at which the wake flow is determined to enter the third airfoil row.

8. The method according to claim 1, wherein at least a majority of the mid-channel points of the airfoils in the third airfoil row are located at the approximate location at which the wake flow is determined to enter the third airfoil row.

9. The method according to claim 1, wherein:
    the first airfoil row and the third airfoil row each comprises a row of rotor blades and the second airfoil row comprises a row of stator blades; and
    the first airfoil row, the second airfoil row, and the third airfoil row comprise compressor airfoil rows.

10. In a turbine engine that includes as least five successive axially stacked rows of airfoils in one of a compressor and a turbine: a first airfoil row, a second airfoil row, a third airfoil row, a fourth airfoil row, and a fifth airfoil row; wherein the first airfoil row, the third airfoil row, and the fifth airfoil row each comprise one of a row of rotor blades and a row of stator blades, and the second airfoil row and the fourth airfoil row comprises the other;
    the method of establishing the circumferential position of the airfoils of the first airfoil row, the airfoils of the third airfoil row and the airfoils of the fifth airfoil row with respect each other, comprising:
    selecting an operating condition;
    determining at the operating condition the path of the wake flow from the trailing edge of the airfoils in the first airfoil row;
    determining at the operating condition the path of the wake flow as the wake flow enters and passes through the second airfoil row;
    determining at the operating condition the path of the wake flow from the second airfoil row to the location where the wake flow enters the third airfoil row;
    determining at the operating condition the path of the wake flow from the trailing edge of the airfoils in the third airfoil row;
    determining at the operating condition the path of the wake flow as the wake flow enters and passes through the fourth airfoil row;

determining at the operating condition the path of the wake flow from the fourth airfoil row to the location where the wake flow enters the fifth airfoil row;

locating at least a majority of the mid-channel points of the airfoils in the third airfoil row within +/−25% pitch of the third airfoil row with respect to the location at which the wake flow is determined to enter the third airfoil row; and locating at least a majority of the mid-channel points of the airfoils in the fifth airfoil row within +/−25% pitch of the fifth airfoil row with respect to the location at which the wake flow is determined to enter the fifth airfoil row;

wherein:
the first airfoil row comprises a row of compressor rotor blades in a fourteenth stage of the compressor;
the second airfoil row comprises a row of compressor stator blades in the fourteenth stage of the compressor;
the third airfoil row comprises a row of compressor rotor blades in a fifteenth stage of the compressor;
the fourth airfoil row comprises a row of compressor stator blades in the fifteenth stage of the compressor;
the fifth airfoil row comprises a row of compressor rotor blades in a sixteenth stage of the compressor;
the row of rotor blades in the fourteenth stage comprises 64 rotor blades, the row of rotor blades in the fifteenth stage comprises 64 rotor blades, and the row of rotor blades in the sixteenth stage comprises 64 rotor blades; and
the row of stator blades in the fourteenth stage comprises 132 stator blades, and the row of stator blades in the fifteenth stage comprises 130 stator blades.

11. The method according to claim 10, wherein:
substantially all of the mid-channel points of the airfoils in the third airfoil row are located within +/−25% pitch of the third airfoil row with respect to the location at which the wake flow is determined to enter the third airfoil row; and
substantially all of the mid-channel points of the airfoils in the fifth airfoil row are located within +/−25% pitch of the fifth airfoil row with respect to the location at which the wake flow is determined to enter the fifth airfoil row.

12. The method according to claim 10, wherein:
the turbine engine is configured such that there is substantially no relative motion between the first airfoil row, the third airfoil, and the fifth row during operation;
the turbine engine is configured such that the first airfoil row, the third airfoil row, and the fifth airfoil row have substantially the same relative motion in relation to the second airfoil row and the fourth airfoil row during operation; and
the turbine engine is configured such that the first airfoil row, the third airfoil row, and the fifth airfoil row have substantially the same number of airfoils.

13. The method according to claim 10, wherein:
at least a majority of the mid-channel points of the airfoils in the third airfoil row are located within +/−24.5% pitch of the third airfoil row with respect to the location at which the wake flow is determined to enter the third airfoil row; and
at least a majority of the mid-channel points of the airfoils in the fifth airfoil row are located within +/−24.5% pitch of the fifth airfoil row with respect to the location at which the wake flow is determined to enter the fifth airfoil row.

14. The method according to claim 10, wherein:
at least a majority of the mid-channel points of the airfoils in the third airfoil row are located within +/−15% pitch of the third airfoil row with respect to the location at which the wake flow is determined to enter the third airfoil row; and
at least a majority of the mid-channel points of the airfoils in the fifth airfoil row are located within +/−15% pitch of the fifth airfoil row with respect to the location at which the wake flow is determined to enter the fifth airfoil row.

15. The method according to claim 10, wherein:
at least a majority of the mid-channel points of the airfoils in the third airfoil row are located within +/−5% pitch of the third airfoil row with respect to the location at which the wake flow is determined to enter the third airfoil row; and
at least a majority of the mid-channel points of the airfoils in the fifth airfoil row are located within +/−5% pitch of the fifth airfoil row with respect to the location at which the wake flow is determined to enter the fifth airfoil row.

16. The method according to claim 10, further comprising the steps of:
at least a majority of the mid-channel points of the airfoils in the third airfoil row are located at the approximate location at which the wake flow is determined to enter the third airfoil row; and
at least a majority of the mid-channel points of the airfoils in the fifth airfoil row are located at the approximate location at which the wake flow is determined to enter the fifth airfoil row.

17. In a turbine engine that includes at least three successive axially stacked rows of airfoils in one of a compressor and a turbine: a first airfoil row, a second airfoil row, and a third airfoil row; wherein the first airfoil row and the third airfoil row both comprise one of a row of rotor blades and a row of stator blades, and the second airfoil row comprises the other; the method of establishing the circumferential position of the airfoils of the third airfoil row with respect to the circumferential position blades of the first row of blades, comprising:
selecting an operating condition;
determining at the operating condition the path of the wake flow from the trailing edge of the airfoils in the first airfoil row;
determining at the operating condition the path of the wake flow as the wake flow passes through the second airfoil row;
determining at the operating condition the path of the wake flow from the second airfoil row to the location where the wake flow enters the third airfoil row; and
locating at least a majority of the mid-channel points of the airfoils in the third airfoil row within +/−25% pitch of the third airfoil row with respect to the location at which the wake flow is determined to enter the third airfoil row;
wherein:
the first airfoil row comprises a row of compressor rotor blades in a fifteenth stage of the compressor;
the second airfoil row comprises a row of compressor stator blades in the fifteenth stage of the compressor; and
the third airfoil row comprises a row of compressor rotor blades in a sixteenth stage of the compressor;
the row of rotor blades in the fifteenth stage comprises 64 rotor blades, and the row of rotor blades in the sixteenth stage comprises 64 rotor blades; and
the row of stator blades in the fifteenth stage comprises 130 stator blades.

* * * * *